United States Patent [19]

Gordon et al.

[11] 4,306,911
[45] Dec. 22, 1981

[54] METHOD FOR THE PRODUCTION OF A FIBER-REINFORCED HYDRAULICALLY SETTING MATERIAL

[75] Inventors: Otto W. Gordon, Oberurnen; Peter E. Meier, Wädenswil; Gero Büttiker, Hirzel, all of Switzerland

[73] Assignee: Amiantus, (A.G.), Niederurnen, Switzerland

[21] Appl. No.: 119,602

[22] Filed: Feb. 7, 1980

[30] Foreign Application Priority Data

Feb. 9, 1979 [CH] Switzerland .......................... 1297/79
Dec. 21, 1979 [CH] Switzerland ....................... 11440/79

[51] Int. Cl.³ ............................................... C04B 7/02
[52] U.S. Cl. ..................................................... 106/99
[58] Field of Search ............................ 106/93, 99, 90

[56] References Cited

U.S. PATENT DOCUMENTS 2,592,345  4/1952  Schnell et al. ......................... 106/93
2,623,828  12/1952  Dove .................................... 106/99
3,311,483  3/1967  Garnier et al. ........................ 106/93

Primary Examiner—James Poer
Attorney, Agent, or Firm—Sughrue, Mion, Zinn, Macpeak and Seas

[57] ABSTRACT

Asbestos-free fiber reinforced hydraulically setting materials, which comprise a slurry of one or more hydraulic binding agents, fibers, water and perhaps additional additives, are obtained when, as fiber, 2 to 20% by volume of filter fibers and 0,5 to 20, preferably 1 to 10% by volume reinforcing fibers are used, both of which are subjected to preliminary treatment which improves their dispersability. By means of the preliminary treatment the fibers can be uniformly distributed in the slurry. The material can be worked on apparatus common for the production of asbestos cement and used for the same purposes as asbestos cement.

16 Claims, No Drawings

METHOD FOR THE PRODUCTION OF A FIBER-REINFORCED HYDRAULICALLY SETTING MATERIAL

BACKGROUND OF THE INVENTION

1. Field of the Invention

The present invention relates to a method for the production of a fiber-reinforced hydraulically setting material, particularly a cement material, having two fibrous components, as well as to molded elements of all kinds produced from such materials.

2. Description of the Prior Art

Asbestos reinforced cement objects have proven themselves well and have assumed a firm place as construction materials during recent decades. Particularly wide-spread in the industry is the manufacture of a variety of structural components such as pipes, corrugated plates, roof shingles, etc., using de-watering procedures, for example as described by Magnani [see Heribert Hiendl, "Asbestzementmaschinen", page 42 (1964)] or Hatschek [see below]. One preferred method, the rolling method, as described by Hatschek, has been known for several decades [AT-PS 5970].

These known methods for the production of, for example asbestos cement pipes and plates, are based on the use of endless wet machines. In this type of machine a very thin asbestos suspension is coated over a chest and a revolving screen drum in the form of a nonwoven fabric on a felt and is then rolled to the desired thickness with the aid of shaping rollers or pipe cores. Depending on the type of asbestos fiber used, the following problems may arise during this process:

The run-of-the-mine, pre-opened asbestos must be further opened in spreading apparatus in the asbestos cement factory, i.e., it must be further spread or opened in a edge mill. One of the most difficult problems is opening different natural types of asbestos fiber without shortening them and developing dust, if the degree of opening may not exceed a certain amount, because otherwise water removal or transport difficulties may occur on the endless wet machine.

In addition to opening the asbestos, a proper composition of the various types of asbestos fiber, for example length, talc content, etc., are of basic significance for proper machine operation and quality of the products to be manufactured.

The spreading of the asbestos and the mixing of the various types of asbestos have a decisive effect on production and quality of the final products. Only by controlling these parameters is it possible to obtain weatherproof products with good mechanical characteristics. The chest mold for the endless wet machine and the agitators also play an important role in the proper distribution of the asbestos fibers in the fleece with respect to the fiber direction of the asbestos in the final product. The fiber distribution in the fleece is significant for the economic use of the asbestos fibers, because with poor chest geometry and agitator effects there is the danger of asbestos concentrations in the fleece, whereby uniform fiber reinforcement in the product is impaired. Further, this type of asbestos concentration is disadvantageous with regard to the behaviour of the product in areas endangered by frost and with regard to the adhesion characteristics of color coatings.

The vacuum commonly used in various types of vacuum boxes must be correctly adjusted, while the water is being removed from the asbestos cement fleece on the felt-sieve, depending on the spread of the fibers. If this is not done cement particles may be torn out of the fleece or the fleece may not be sufficiently de-watered, which results in poor products during rolling.

During the rolling process additional water is generally removed from the resulting product by compression. The pressure applied must be adapted to the water content of the fleece as well as to the rolled wall thickness. If this is not done rigidity problems or loss of quality may occur.

In addition to such technical problems and settings in the production train necessary to ensure successful processing, these known procedures are based on the excellent affinity and the filtering action with respect to cement, i.e., the capacity of the asbestos fibers to retain cement. In addition to the good cement retaining action of the asbestos fibers, however, they also serve simultaneously as reinforcing fibers in the final product.

These two advantageous characteristics of asbestos fibers are accompanied by a very specific disadvantage. The natural physical characteristics, particularly the low breaking elongation of asbestos, gives pure asbestos cement products a certain brittleness. This characteristic is demonstrated by limited impact resistance. Continuous attempts have been made to find new cement reinforcing fibers which might lead to more flexible final products.

In a 1951 patent relating to the manufacture of asbestos cement products (German Pat. No. 878,918), the reinforcement of cement with fibrous materials such as cellulose or other organic or inorganic fibers is disclosed. During recent years a great number of natural and synthetic fibers have been tested in this context with regard to their suitability as cement reinforcing fibers. For example, tests have been performed with cotton, silk, wool, polyamide fibers, polyester fibers, polypropylene fibers and inorganic fibers such as glass fibers, steel fibers, carbon fibers, etc.

The construction material industry has published a number of methods for the production of wood reinforced cement products. Examples are: German Pat. Nos. 585,581; 654,433; 818,921; 915,317; British Pat. Nos. 252,906; 455,571; SE-OS 13139/68; SE-PS 60,225 and Swiss Pat. No. 216,902.

All methods disclosed in these patents, however, are concerned with the processing of cement with a minimum quantity of water, necessary for the hydraulic setting. The technology of mixing cement, wood chips and water, as well as the manufacture of construction materials from these mixtures, is completely different from the known Hatschek process, which operates with diluted aqueous slurries. Any preliminary treatment of the wood materials disclosed in the above patents with various mineral salts serves only to stabilize or mineralize the cellulose components of the wood, which swell when exposed to water. The mineral salts can also serve to deactivate deleterious materials in the wood which could impair setting of the cement, so that a good binding between wood and cement is assured.

In view of the technical difficulties described above, which can occur with the de-watering machines commonly used in the asbestos cement industry, it is apparent that a simple substitution of other fibers for asbestos fibers leaves it practically impossible to produce satisfactory fiber reinforced cement products on a large scale with the methods and apparatus commonly used.

The proposed methods have also never been realized in industrial production.

One of the greatest problems with other than asbestos fibers has been the poor distribution of these fibers in the cement-water slurry. The fibers separate from the mixture and form knots. The poor cement retention capacity of most fibers also renders industrial production impossible. Furthermore, the strength added to the cement products by many synthetic fibers is a minimum, primarily because hydrophobic, organic fibers provide only poor adhesion in the cement matrix. It has been determined, however, that with an addition of a small quantity of asbestos, the production of fiber reinforced products according to current de-watering processes is possible (British Pat. No. 855,729). The addition of from 0,5 to 5% asbestos makes it possible for organic and inorganic fibers to be better distributed in a cement-water slurry, while simultaneously assuring sufficient cement retaining effect during the de-watering process.

To improve the adhesion of fibers in the cement matrix it has been proposed to use fibrillated polyamide films (U.S. Pat. No. 3,591,395).

In the U.S.S.R. magazine "Polim. Stroit. Mater.", 1975, 41, pages 5127, [C. A. 86, 7766/Z (1977)] it is stated that fibers with a rectangular cross section exhibit improved adhesive capacity. Further inventors describe thermoplastic fiber sections provided at their ends with a wider, melted portion, to improve the anchoring of these fibers in a cement matrix [Ja-AS 7,403,7404].

In German OS No. 2,819,794 it is proposed to produce fiber reinforced cement plates with the aid of specially modified polypropylene fibers of two different lengths. Where de-watering processes are used in manufacturing the mixture of the polypropylene fiber sections is premixed with cellulose fibers and with a portion of a cement-water slurry before the desired concentration of solid matter necessary for operation is adjusted. However, the process is limited to the use of specially modified polypropylene fibers with defined mixtures of different fiber lengths. Other fibers cannot be used for this purpose.

For various reasons, however, it is desirable to produce fiber reinforced cement products with good mechanical characteristics on production apparatus as presently used in the asbestos cement industry and to be able to produce these products without the aid of an admixture of asbestos and with the use of conventional fibers.

SUMMARY OF THE INVENTION

It has been surprisingly discovered that it is possible to form asbestos-free products directly on existing machines by the combination of two types of fibers available on the market and having different properties, hereinafter called reinforcing fibers and filter fibers.

The products obtained in this manner have proven to be superior to conventional asbestos cement products both with regard to various mechanical characteristics as well as with regard to the working environment.

A significant characteristic of the present invention is that a coating which is substantially insoluble is formed on both types of fibers, for example a coating of two salts which, when combined, yields an insoluble salt, when the fibers are added to a solution of a first water-soluble salt and a second salt is then admixed with this fiber-salt-solution suspension.

Thanks to this preliminary treatment of the fibers it is possible to produce a flawless fleece from a cement-slurry on a conventional de-watering machine of the Hatschek type.

For the sake of simplicity, reference will be made in the present specification to cement as the preferred binding material. However, all other hydraulically setting binding materials can also be employed in place of cement.

DETAILED DESCRIPTION OF THE PREFERRED EMBODIMENTS

The method according to the invention will be explained as follows:

The term "filter fibers" refers to common fibrous systems which provide no appreciable reinforcement of the cement. The primary purpose of these fibers is to retain the cement in the mixture during de-watering of the fiber-cement slurry.

In conventional asbestos-cement production this purpose is performed by the asbestos fibers which simultaneously serve as "reinforcing fibers". In the method according to the present invention suitable filter fibers are, for example, cellulose fibers of all kinds, such as those in the form of pulp, mechanical wood pulp, waste paper, sawdust, cellulose-containing wastes from refuse disposal systems, etc. However, wool fibers, silk or fibrides made for example of polypropylene, may be used. Furthermore, inorganic fibers such as kaolin or rockwool may also be employed in the method according to the present invention.

A number of values for the cement retaining capacity of various filter fibers are assembled in following Table 1. The filtration tests were performed on a Hatschek machine. The Hatschek machine was coated with a aqueous slurry of 72 grams per liter cement and 8 grams per liter filter fiber.

The suction device in the de-watering section was adjusted so that the fiber-cement fleeces exhibited a residual water content of 30% on leaving the machine. Samples were taken from the remaining water of the machine and the solids content therein determined by filtration with a suction filter. Weighing of the solids took place after drying at 110° C. for 6 hours.

TABLE 1

| Cement retaining Capacity of Various Filter Fibers Employed on a Hatschek Machine | |
|---|---|
| Filter Fiber Type | Cement Retaining Capacity in % of the used Cement |
| Rockwool Lapinus Type 793176 | 88% |
| Rockwool DI | 70% |
| Waste paper, without gazed paper | 71% |
| Waste paper/cellulose KHBX = 4:1 | 65% |
| Hostapulp EC-5300 | 93% |
| Hostapulp R-830 | 86% |
| Asbestos (similar to Example 1) | 72% |

In order to facilitate the uniform distribution of these filter fibers in the cement slurry, they are subjected to a preliminary treatment according to the invention which will be discussed in more details below. The concentration of the filter fibers in the whole cement-fiber mixture varies from 2% by volume to 20% by volume. It depends largely on the material and preferably amounts to 8 to 15% by volume.

In addition to filter fibers as above disclosed, the use of reinforcing fibers in combination therewith is compulsory in the present invention. All known inorganic and organic reinforcing fibers can be used as reinforcing fibers herein, including glass, steel, carbon, aramide, polypropylenes, polyvinyl alcohols, polyesters, polyamides, polyacrylic fibers, etc.

In order that a reinforcing fiber may be equal to its task in products having high strength, for example corrugated panels and the like, the fiber must have the highest possible tearing strength, at least 6 grams/denier, and the lowest possible breaking elongation, generally less than 10%. For products with lower demands, other reinforcing fibers, for example from waste materials, can also be used.

The reinforcing fibers are present in the cement-fiber mixture in quantities of from 0,5 to 20% by volume, preferably 1 to 10% by volume and especially 4 to 8% by volume. The reinforcing fibers are preferably admixed in cut lengths of from 4 to 25 millimeters, whereby both individual fibers of uniform length and a mixture of fibers of different length can be used. Ground or powdered fibers can be used as well. The titer of the individual fibers can vary over a wide range, but titer of from 0,5 to 6 dtex is preferred. The reinforcing fibers are generally uniformly distributed in the cement compound. In special cases, such as, for example, molded elements, additional fiber reinforcement can be provided at locations which are subjected to mechanical forces. The reinforcement may for example take the form of fiber fleeces, yarns, cables, nets, fabrics, etc., which can be rolled in or simply inserted.

Reinforcing fibers with round cross sections as well as non-round cross sections, such as fibers with rectangular or multilobal cross sections, may be used. Furthermore, reinforcing fibers of a single type as well as mixtures of different reinforcing fibers may be used. In addition to the pretreatment according to the invention the fibers can be made especially compatible with cement by known additional treatments or coatings.

The preliminary treatment according to the invention, which improves the distribution and behavior of the fibers in the dilute cement slurry, comprises the preliminary treatment of the filter fibers and the reinforcing fibers to form an inorganic compound which is substantially insoluble in water. The preliminary pretreatment of the fibers can be conducted prior to fiber introduction into the slurry or after fiber introduction into the slurry.

Especially suitable materials to carry out the fiber treatment are inorganic compounds, of which, for example, a first compound is first brought into contact with the fibers in the form of an aqueous solution and thereafter one or more compounds are added so as to react with one another to form at least one insoluble compound in and/or on the fiber.

Suitable fiber pre-treatments can, for example, be carried out with the following systems: iron sulfate-calcium hydroxide; aluminum sulfate-calcium hydroxide; aluminum sulfate-barium hydroxide; iron sulfate-barium hydroxide; iron chloride-calcium hydroxide; zirconium sulfate-calcium hydroxide or with various borates. A particularly suitable pre-treatment consists of precipitation of aluminium hydroxide and calcium sulfate on the fibers by treating the fibers with aqueous aluminum sulfate solution and thereafter adding calcium hydroxide.

The preliminary treatment generally takes place by spraying, submersing or other contacting of the fibers with an aqueous solution of the soluble reaction participant with subsequent addition of the second reaction participant used.

The treatment, for example the precipitation of calcium sulfate and aluminum hydroxide from aluminum sulfate and calcium hydroxide, effects a uniform distribution of the individual fibers in the cement-fiber slurry. The preliminary treatment of the two types of fibers can be effected in a common bath either separately but simultaneously or successively.

Generally, the fibers are treated with a solution which, depending on the solubility of the compound used, has a concentration of from 2 to 30%, preferably 8 to 15% and most preferably a concentration of about 10% by weight based on the total solution weight. With regard to fiber weight, the first component will generally amount to about 5 to 50% by weight, preferably 10 to 20% and particularly preferably approximately 15% by weight. The second component is advantageously employed in stoichiometric excess over the first component, which excess may amount to 30 times and more. Preferably an excess of from 3 to 30 times is used, and particularly preferably an excess of 20 times.

Hydrophobic reinforcing fibers, such as polypropylene fibers, polyamide fibers, polyester fibers, etc., can be provided prior to the preliminary fiber treatment according to this invention with a hydrophilic organic finish, if desired. This type of finish can be obtained from various manufacturers and is based on acrylates, epoxy compounds, isocyanates, etc., and can be applied to the fibers or films by coating or spraying. Curing of this type of covering is accomplished either by catalysts and/or heat treatment.

Hydrophobic reinforcing fibers containing inorganic additives such as barium sulfate, calcium carbonate, calcium sulfate, talc, titanium dioxide, etc., which are added to the fibers before spinning, can also be used. The hydraulically setting binding agent suitable for this invention should be a material which contains an inorganic cement and/or inorganic binding or adhesive agent, which is hardened by hydration. Among especially preferred binding agents which are hardened by hydration are, for example, Portland cement, aluminous cement, iron Portland cement, trass cement, blast-furnace slag cement, gypsum, the calcium silicate produced in autoclave treatments, as well as combinations of these individual binding agents.

The pretreated fibers, the hydraulically setting binding agent, water, and all other usual materials such as fillers, colorants, etc., are mixed in usual manner to form a slurry which is worked on conventional de-watering apparatus, such as rolling machines, continuous dewatering systems, e.g., a monostrand system, endless wet machines, long wires, injection systems or filter presses to form the desired article such as panels, corrugated panels, pipes, roof tiles and elements of all kinds as can be formed in a known manner by hand or machine. The thus formed products are then left in a conventional manner to set.

The present invention is illustrated in greater detail below by various examples, but these examples are not intended to restrict the invention in any way. Although the invention is of particular value for the production of asbestos-free products, it is also possible to replace a portion of the reinforcing fibers by asbestos fibers.

To the extent it is not stated otherwise, all percentages and ratios in the subsequent examples are by weight and the examples are carried out at ambient temperature. For a person skilled in the art it would be a simple matter to modify the following examples depending on the purpose of use of the material by a suitable selection of the fibers and/or the method steps and apparatus.

EXAMPLE 1

Comparative Example: Asbestos Cement

Canadian asbestos, grade 4, was mixed in a ratio of 1:3 with Russian asbestos, grade 5, in an edge mill together with 40% by weight of water (based on the weigth of asbestos) for 30 minutes. 153 kilograms (dry weight) of this asbestos mixture was placed in a high speed vertical mixer, in which there was 1,5 cubic meters of water and the asbestos was further opened for 10 minutes. After pumping the resulting slurry into a horizontal mixer, 1 metric ton of Portland cement with a specific surface area of 3,000 to 4,000 cm$^2$/g was admixed therewith. The thus-obtained asbestos-cement slurry was pumped into a machine chest from which it was distributed to a Hatschek machine. After 7 revolutions of the format roll on this machine, panels of 6 millimeters were produced which were pressed to a thickness of 4,8 millimeters between oiled plates for 45 minutes in a stack press at a specific pressure of 250 bars. Testing took place after a setting time of 28 days, after the panels were watered 3 days. The test results are assembled in Table 2.

EXAMPLE 2

Comparative Example: Filter Fibers Alone

Mechanical wood pulp was ground and mixed in an edge mill for 15 minutes with 50% (of wood pulp) of an aqueous 10% aluminum sulfate solution. The thus-treated wood pulp was then stored for at least 3 days in order to additionally amplify the effect of the aluminum sulfate. 102 kilograms of mechanical wood pulp pre-treated in this manner was then pulped in 1 cubic meter of water in a solvo pulper for 10 minutes. Subsequently, the resulting suspension was diluted to 2,5 cubic meters and 15 kilograms of aluminum sulfate as a 20% aqueous solution was added.

The suspension was then mixed with 50 kilograms of powdered calcium hydroxide and the resulting suspension pulped for an additional 5 minutes in a solvo pulper, whereupon it was pumped into a slow running horizontal mixing apparatus in which the reaction of aluminum sulfate and calcium hydroxide continued for 15 minutes.

After pumping the resulting product into a cement mixer, 1,000 kilograms of cement, e.g. Portland cement, with a specific surface of approximately 3,000 to 4,000 cm$^2$/g was mixed therewith for 10 minutes. To improve flocculation, 80 grams of polyacrylamide in the form of a 0,2% aqueous solution thereof was then added. This mixture was then supplied from a machine chest to a Hatschek machine and further worked as described in Example 1. The results are assembled in Table 2.

EXAMPLE 3

Mechanical wood pulp was first ground and mixed in an edge mill for 15 minutes with 50% of an aqueous 10% aluminum sulfate solution. The thus-treated mechanical wood pulp was then stored for at least 3 days in order to amplify the effect of the aluminum sulfate. The thus pre-treated mechanical wood pulp was then pulped for 10 minutes as an 8% suspension thereof in water in a solvo pulper, which corresponds to 80 kilograms of mechanical wood pulp per 1 cubic meter of water. This fiber suspension was then diluted to 2,5 cubic meters of water, and 22 kilograms PVA fibers cut length 6 millimeters, 2,3 dtex, were admixed and the system further pulped for 5 minutes. Subsequently, 15 kilograms of aluminum sulfate was admixed therewith as an aqueous 20% aluminum sulfate solution and the mixture treated with 50 kilograms of powdered calcium hydroxide. After an additional 5 minutes of pulping the suspension was pumped into a slow running horizontal mixing apparatus and left to react there for 15 minutes.

The reacted system was pumped into a cement mixer with 1,000 kilograms of cement, e.g. Portland cement with a specific surface of about 3,000 to 4,000 cm$^2$/g and mixed therein for 10 minutes. To achieve improved flocculation, 80 grams of polyacrylamide in the form of a 0,2% aqueous solution thereof was then admixed. The mixture was then fed from a machine chest to a Hatschek machine and processed into panels as described in Example 1. The results are assembled in Table 2.

EXAMPLE 4

56 kilograms of polypropylene fibride was pulped in a solvo pulper as a 4% aqueous suspension thereof for 10 minutes. After diluting with water to 2,5 cubic meters, 22 kilograms of ground polyacrylonitrile fibers ("Dralon") having an average fiber length of 6 millimeters and a fineness of 2,2 dtex was added and the system further pulped for an additional 5 minutes. Subsequently, 15 kilograms of aluminum sulfate as a 20% aqueous solution thereof was added, the system pulped for 5 minutes in the solvo pulper and treated with 50 kilograms of powdered calcium hydroxide. This mixture was then pulped for an additional 5 minutes in the solvo pulper and after being pumped into a slow running horizontal mixer, was left to react for 15 minutes. Cement addition and the further processing were in accordance with Example 2. The results are assembled in Table 2.

TABLE 2

Test Results of Examples 1 through 4

| Example No. | Reinforcing Fiber | Volume % | Filter Fiber | Volume % | Cement Volume % | N/mm$^2$ Bending Tensile Strength | N/mm/mm$^2$ Specific Impact Strength | Density g/cm$^3$ |
|---|---|---|---|---|---|---|---|---|
| 1 | Asbestos | 12 | — | — | 88 | 26,5 | 1,8 | 1,80 |
| 2 | — | — | Mechanical Wood Pulp | 20 | 80 | 14,0 | 0,3 | 1,62 |
| 3 | Polyvinyl Alcohol | 4 | Mechanical Wood Pulp | 16 | 80 | 24,6 | 2,8 | 1,70 |
| 4 | Polyacrylnitrile | 4 | Polypropylene Fibride | 16 | 80 | 22,2 | 2,4 | 1,60 |

The above Example 1 is intended as a comparative example and indicates the values which can be achieved using conventional methods. The asbestos fibers therein simultaneously performed the role of filter fibers as well as of reinforcing fibers.

In Example 2 the values reflect the results which were found when only cellulose fibers were employed as filter fibers, and even in this case a preliminary treatment of the filter fibers according to the invention was necessary, because without this treatment, production on a Hatschek machine was extremely poor.

There is no example with reinforcing fibers alone because, with the exception of asbestos, it was impossible to produce fiber reinforced panels according to existing rolling methods with only reinforcing fibers.

For the same reason, it was not possible to list examples of reinforcing fiber/filter fiber systems without the pre-treatment according to the invention.

Examples 3 through 5 (later presented) correspond to the method according to the invention and establish that cement products reinforced by the combination of reinforcing and filter fibers are produced which have superior impact resistance characteristics than asbestos-cement products and simultaneously have high bending strength.

Example 5 shows the use of the method according to this invention for the production of corrugated panels. Proper shaping makes especially high demands on the fiber-cement mixture.

EXAMPLE 5

Mechanical wood pulp and unbleached Sekunda cellulose were ground and mixed in a ratio of 1:4 in an edge mill for 15 minutes with 50% of an aqueous 10% aluminum sulfate solution and then stored for 3 days. 40 kilograms (dry weight) of this mechanical wood pulp-cellulose mixture was then placed in a solvo pulper, diluted with water to an 8% solids content and pulped for 5 minutes. 30 kilograms of polypropylene fibrides and 375 liters of water were then added thereto and the system pulped for an additional 5 minutes in the solvo pulper. after dilution of the resulting filter fiber suspension to a total of 2,5 cubic meters with water, 22 kilograms of polyvinyl alcohol (PVA) fibers of an average length of 6 millimeters and 2,3 dtex were added thereto and the system pulped for an additional 5 minutes in the solvo pulper. 15 kilograms of aluminum sulfate (as an aqueous 20% solution thereof) was then added thereto and the system mixed with 50 kilograms of powdered calcium hydroxide. After an additional 5 minutes of pulping the suspension was pumped into a slow runnning horizontal mixing apparatus and left there to react for 15 minutes.

The solution was then pumped into a cement mixer and 750 kilograms of Portland cement (as above) and 250 kilograms of quick setting cement from the Permooser Cement Works, Vienna, with a specific surface area of between 4,000 to 5,000 cm²/g were added thereto and the system was mixed for 10 minutes. To improve flocculation, 80 grams of polyacrylamide in the form of an aqueous 0,2% solution thereof was then admixed therewith. The mixture was then supplied from a machine chest to a Hatschek machine and processed into corrugated panels in a conventional manner. The solids concentration in the drainer was constantly checked so that it did not exceed 80 grams per liter. Dilution was done with recirculated water. A fleece thickness of from 0,35 to 0,40 mm resulted on each screen cylinder. The resulting fleece had most of the water removed on the felt. The vacuum, however, had to be carefully set, because otherwise the fleece would become too dry and tend to separate into layers on the format roll.

The water content on leaving the format roll was preferably not less than 28%, so that no cracks would appear in the corrugations during subsequent forming into corrugated panels. Observing the mode of operation given, panels 6 to 7 millimeters thick were rollend which were supplied to a corrugation sucker after separation from the formal roll.

Immediately after leaving the corrugation sucker some of the panals were placed between oiled plates for setting, and after 10 hours they were removed and placed in storage. The rest of the panels was pressed in an individual press at 150 bars for 6 hours and subsequently left to set between oiled plates for 10 hours, whereafter they were stored for 28 days.

A breaking strength test after 28 days on a corrugated panel, 2,5 meters long, 6 millimeters thick, profile 7, in the watered state was 3,600 N for an unpressed corrugated panel with a density of 1,30 grams per cubic centimeter being supported at $\frac{2}{3}$ of the length. For a pressed corrugated panel a breaking load of 6,200 N was measured with a density of 1,45 grams per cubic centimeter.

As a comparison, an asbestos cement corrugated panel of the same shape and thickness with identical testing equipment in the pressed state had a breaking load of 5,100 N with a density of 1,62 grams per cubic meter. The pressed asbestos cement corrugated panel had a breaking load of 7,000 N with a density of 1,8 grams per cubic centimeter.

In a conventional frost test, the pressed asbestos-free corrugated panel yielded 500 cycles and the unpressed panel 300 cycles, which cycles were withstood without damage (+40° C./−40° C. in water, 8 cycles per day). The frost test on the pressed conventional asbestos cement corrugated panels yielded 320 cycles and on the unpressed corrugated panels 180 cycles before the first fleece layer began to separate.

What is claimed is:

1. In a method for the production of a fiber reinforced hydraulic setting material, in which a hydraulic binding agent is mixed with fibers and water to form a slurry, the improvement wherein said fibers comprise 2 to 20% by volume based on the solid content, of filter fibers and 0.5 to 20% by volume based on the solid content of reinforcing fibers, both of which fibers are subjected to a treatment which increases their dispersability in the slurry comprising depositing a compound which is substantially insoluble in water on the surface of the fibers, and wherein water in a quantity greater than is necessary to set the binding agent is added.

2. A method according to claim 1, wherein the treatment of the fibers comprises depositing by precipitating at least one reaction product in and/or on the fibers by contacting the fibers with an aqueous solution of a first compound whereafter the thus treated fibers are brought into contact with a second compound, which reacts with said first compound to yield said reaction product.

3. A method according to claim 1 or 2, wherein the filter fibers are inorganic and/or organic fibrous materials which, when added in a quantity of 0.8% to an aqueous 7.2% cement dispersion, retain at least 60% of the cement after water removal of the dispersion on a dewatering machine.

4. A method according to one of claims 1 or 2, wherein said reinforcing fibers are inorganic or organic synthetic fibers selected from the group consisting of steel fibers, glass fibers, carbon fibers, polyvinyl alcohol fibers, polypropylene fibers, viscose fibers, acrylic fibers, phenol-formaldehyde resin fibers, polyester fibers, aromatic and aliphatic polyamide fibers or mixtures thereof.

5. A methd according to claim 4, wherein the reinforcing fibers experience a maximum extension of 1% under a tensile stressing of 1 gram/denier.

6. A method according to claim 4, wherein the reinforcing fibers have a breaking strength of at least 6 grams per denier on a breaking elongation of at most 10%.

7. A method according to one of claims 1 or 2, wherein the reinforcing and filter fibers are added to the slurry separately.

8. A method according to one of claims 1 or 2, wherein the fibers are subjected to said treatment before being admixed with the slurry, either separately with respect to types or mixed.

9. A method according to one of claims 1 or 2, wherein the fibers are subjected to said treatment in the slurry.

10. A method according to one of claims 1 or 2, wherein the treatment of the fibers by depositing first takes place with a member selected from the group consisting of aluminum sulfate, iron sulfate and iron chloride in aqueous solution whereafter precipitation of a reaction product is conducted by the addition of a member selected from the group consisting of calcium hydroxide, barium hydroxide or a borate.

11. A method according to claim 5, wherein the reinforcing fibers have a breaking strength of at least 6 grams per denier on a breaking elongation of at most 10%.

12. A method according to one of claims 1 or 2, wherein the volume of said filter fibers is 1 to 10% by volume.

13. A method according to one of claims 1 or 2, wherein said first compound is a salt, said second compound is a salt and said reaction product is a salt.

14. In a process for producing a fiber reinforced element, the improvement comprising using a fiber reinforced hydraulic setting material produced by mixing a hydraulic binding agent with fibers in water to form a slurry and further wherein said fibers comprise 2 to 20% by volume based on the solid content, of filter fibers and 0.5 to 20% by volume based on the solid content of reinforcing fibers, both of which fibers are subjected to a treatment which increases their dispersability in the slurry comprising depositing a compound which is substantially insoluble in water on the surface of the fibers, and wherein water in a quantity greater than is necessary to set the binding agent is added and further including at least partially de-watering said material, shaping said material and then allowing said to set.

15. The process of claim 14, wherein the treatment of the fibers comprises depositing by precipitating at least one reaction product in and/or on the fibers by contacting the fibers with an aqueous solution of a first compound, whereafter the thus treated fibers are brought into contact with a second compound, which reacts with said first compound to yield said reaction product.

16. A fiber reinforced element produced by the process of claim 14 or 15.

* * * * *